US009570095B1

(12) United States Patent
Jain

(10) Patent No.: US 9,570,095 B1
(45) Date of Patent: Feb. 14, 2017

(54) SYSTEMS AND METHODS FOR INSTANTANEOUS NOISE ESTIMATION

(71) Applicant: MARVELL INTERNATIONAL LTD., Hamilton (BM)

(72) Inventor: Kapil Jain, Santa Clara, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 14/600,703

(22) Filed: Jan. 20, 2015

Related U.S. Application Data

(60) Provisional application No. 61/928,936, filed on Jan. 17, 2014.

(51) Int. Cl.
*G10L 21/00* (2013.01)
*G01L 21/02* (2006.01)
*G10L 25/84* (2013.01)

(52) U.S. Cl.
CPC .................................... *G10L 25/84* (2013.01)

(58) Field of Classification Search
USPC ................................ 704/200–230, 500–504
See application file for complete search history.

(56) References Cited

U.S. PATENT DOCUMENTS

| | | | | |
|---|---|---|---|---|
| 5,414,796 A * | 5/1995 | Jacobs | G10L 19/005 | 704/201 |
| 6,766,292 B1 * | 7/2004 | Chandran | G10L 21/0208 | 381/94.3 |
| 7,792,680 B2 * | 9/2010 | Iser | G10L 21/038 | 704/223 |
| 2001/0018650 A1 * | 8/2001 | DeJaco | G10L 19/18 | 704/200.1 |
| 2003/0055646 A1 * | 3/2003 | Yoshioka | G10L 13/033 | 704/258 |
| 2005/0065792 A1 * | 3/2005 | Gao | G10L 19/005 | 704/233 |
| 2009/0163168 A1 * | 6/2009 | Andersen | G10L 21/0208 | 455/307 |

* cited by examiner

*Primary Examiner* — Jesse Pullias

(57) ABSTRACT

In accordance with an implementation of the disclosure, systems and methods are provided for providing an estimate for noise in a speech signal. An instantaneous power value is received that corresponds to a frequency index of a portion of the speech signal. A first weighted power value is updated based on the instantaneous power value and a first weighting parameter. A second weighted power value is updated based on the first weighed power value and a second weighting parameter. An estimate of the noise is computed from the instantaneous power value and the second weighted power value.

20 Claims, 6 Drawing Sheets

500

SYSTEMS AND METHODS FOR INSTANTANEOUS NOISE ESTIMATION

CROSS REFERENCE TO RELATED APPLICATION

This disclosure claims the benefit of U.S. Provisional Application No. 61/928,936, filed Jan. 17, 2014, which is hereby incorporated by reference herein in its entirety.

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted as prior art against the present disclosure.

The disclosed technology relates to instantaneous noise estimation of an audio signal and is applicable to audio processing systems, such as speech recognition or enhancement systems. In speech processing, a noisy audio signal often includes a superposition of a raw speech signal and a noise signal. In order to accurately isolate and process the raw speech signal, the noise signal must be properly estimated so that it can be removed. Noise estimation techniques should be able to quickly and accurately provide an estimate for the noise, and need to be able to do so dynamically as the noise in a signal changes. Early noise estimation techniques, such as voice activity detection, tracked the presence of speech in the audio signal. During periods without speech, the noise estimate is approximated as the instantaneous signal power. During periods of speech, the noise estimate is not updated.

SUMMARY

In accordance with an implementation of the disclosure, systems and methods are provided for providing an estimate for noise in a speech signal. An instantaneous power value is received that corresponds to a frequency index of a portion of the speech signal. A first weighted power value is updated based on the instantaneous power value and a first weighting parameter. A second weighted power value is updated based on the first weighed power value and a second weighting parameter. An estimate of the noise is computed from the instantaneous power value and the second weighted power value.

The first weighed power value applies higher weighting to the recent samples in the portion of the speech signal as compared to the second weighted power value.

The first weighted power value is updated by calculating a weighted sum of the first weighted power value and the instantaneous power value.

The first weighting parameter is computed based on a comparison between the instantaneous power value and the first weighted power value.

The second weighted power value is updated by calculating a weighted sum of the first weighted power value and the second weighted power value.

The second weighting parameter is based on a comparison between the first weighted power value and the second weighted power value.

A maximum value of the second weighting parameter is greater than a maximum value for the first weighting parameter, and a minimum value for the second weighing parameter is less than a minimum value for the first weighting parameter.

BRIEF DESCRIPTION OF THE DRAWINGS

The above and other features of the present disclosure, its nature and various advantages will be more apparent upon consideration of the following detailed description, taken in conjunction with the accompanying drawings in which.

DETAILED DESCRIPTION

This disclosure generally relates to methods for performing instantaneous noise estimation in audio signals, such that the noise estimate is better able to track the actual noise levels in the audio signal. Noisy speech signals include a superposition of a clean or noiseless speech signal and a noisy signal. The noise may result from the presence of one or more sources and may vary in intensity over time. Examples of noise sources include but are not limited to a fan, a motor, a television, a crowd of people, traffic, wind, or any other suitable source of noise. The noise may also result from the presence of electromagnetic interference or thermal noise in a receiver circuitry, such as a circuit in a mobile device. Noise estimation is an important component of speech enhancement and speech recognition systems which must quickly and accurately track variations in the noise of an input signal in order to isolate the clean speech signal. Techniques, such as improved minima controlled recursive averaging (IMCRA), are able to estimate time-fluctuating noise by using the minimum values of the noisy signal. The systems and methods of the present disclosure improve upon IMCRA and especially outperform previous attempts to estimate noise under weak speech conditions. For illustrative purposes, this disclosure is described in the context of estimating instantaneous noise in a noisy speech signal. However, one skilled in the art will realize that the systems and methods disclosed herein may be applied to any type of signal that includes time-fluctuating noise.

Figure 1:
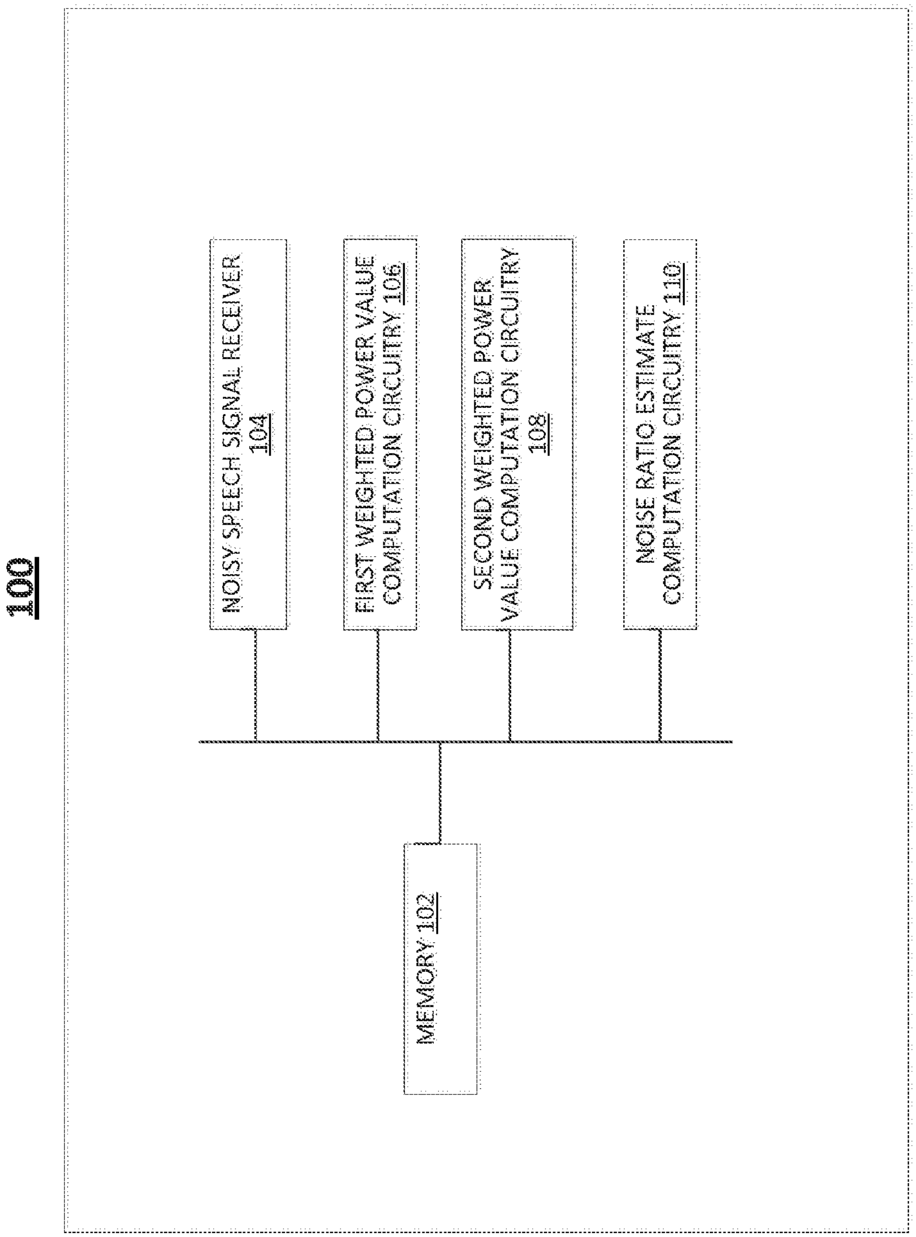
FIG. 1 is a diagram illustrative of a noise estimation system for noisy speech signals, according to an embodiment of the present disclosure.

FIG. 1 is a noise estimation system 100, in accordance with an embodiment of the present disclosure. System 100 includes memory 102, noisy speech signal receiver 104, first weighted power value computation circuitry 106, second weighted power value computation circuitry 108 and noise ratio estimate computation circuitry 110, all of which are connected over a bus.

Noisy speech signal receiver 104 may receive a signal from a device such as a microphone that converts sound pressure levels into an electrical signal, or noisy speech signal receiver 104 may include such a device. The signal may be an analog signal or a discretized version of an analog signal. When the signal is an analog signal, noisy speech signal receiver 104 may include a sampler that converts the analog signal to a vector of discrete signals. Noisy speech signal receiver 104 may include a processor to get the signal into a certain form, such as by controlling the amplitude of the signal or by adjusting other characteristics of the signal. For example, noisy speech signal receiver 104 may quantize the signal, filter the signal, or perform any number of processing techniques on the signal.

In some implementations, noisy speech signal receiver 104 performs a short-term frequency transform (such as a Fourier Transform, for example) on the noisy signal by calculating a Fast Fourier Transform (FFT) on overlapping and equal length portions or frames of the discrete samples. The frames may be indexed by a time iteration parameter n, where n may refer to a reference point in the frame, such as the first sample or the last sample of the frame. The resulting frequency domain representation of each portion of the noisy signal may correspond to a single frame of the signal, which is referenced by the parameter n. The magnitude of the power spectrums may be smoothed using any smoothing operator or method, to obtain a smoothed power magnitude spectrum. For a frequency index k at time iteration n, the smoothed instantaneous power magnitude is denoted S(n,k). While most of the present disclosure is described in relation to a noisy speech signal, one of ordinary skill in the art will recognize that the signal received by noisy speech signal receiver 104 may correspond to any suitable signal and is not limited to noisy speech signals.

Noisy speech signal receiver 104 transmits the smoothed power magnitude spectrum S(n,k) of the noisy speech signal at time iteration n and frequency index k to first weighted power value computation circuitry 106. First weighted power value computation circuitry 106 may compute a first weighted power value $S_L(k)$. The first weighted power value $S_L(k)$ is a value that essentially approximates a local minimum of the instantaneous power S(n,k) in time, for a given frequency index of the noisy speech signal by weighting recent samples more heavily than older samples. In an example, $S_L(k)$ is updated to be a weighted sum of a previous value of $S_L(k)$ and the instantaneous power value S(n,k). The weightings are determined by evaluating whether the instantaneous power value S(n,k) is greater than or less than the previous value of $S_L(k)$. When the instantaneous power S(n,k) is less than the previous value of $S_L(k)$, heavy weighting is applied to S(n,k). In this case, $S_L(k)$ is updated to a value that is close to S(n,k) and therefore may be updated to a significantly different value than its previous value. Alternatively, if S(n,k) is greater than the previous value of $S_L(k)$, heavy weighting is applied to $S_L(k)$. In this case, $S_L(k)$ is updated to a value close to $S_L(k)$, and therefore does not change significantly from its previous value. The computation of $S_L(k)$ is described in detail in relation to FIG. 3. First weighted power value computation circuitry 106 may store $S_L(k)$ in memory 102.

Second weighted power value computation circuitry 108 is configured to update a second weighted power value $S_G(k)$ based on $S_L(k)$ and a previous value of $S_G(k)$. In an example, second weighted power value computation circuitry 108 accesses the first weighted power value $S_L(k)$ from memory 102 to compute the second weighted power value $S_G(k)$. The second weighted power value $S_G(k)$ is a value that essentially approximates a global minimum value of the instantaneous power S(n,k) in time, by weighting recent samples heavily only when they are less than the current value for $S_G(k)$. In an example, $S_G(k)$ is updated to be a weighted sum of a previous value for $S_G(k)$ and $S_L(k)$. A difference value D(k) is representative of a difference between $S_G(k)$ and $S_L(k)$ (e.g., $D(k)=S_L(k)-S_G(k)$). If the difference D(k) is negative, this means that $S_G(k)$ is greater than $S_L(k)$. In this case, the approximate local minimum is lower than the approximate global minimum, such that $S_G(k)$ should be updated to a value that is near $S_L(k)$. This means that a larger weight should be set for $S_L(k)$ than for $S_G(k)$. Otherwise, if the difference is positive, this means that $S_G(k)$ is less than $S_L(k)$. In this case, the approximate global minimum is lower than the approximate local minimum. In an example, the weighting of $S_G(k)$ and $S_L(k)$ may depend on D(k). When the difference D(k) is large, a relatively low weight may be placed on $S_L(k)$ compared to $S_G(k)$. The computation and updating of $S_G(k)$ is described in detail in relation to FIG. 4. Second weighted power value computation circuitry 108 may store the second weighted power value $S_G(k)$ in memory 102.

Noise ratio estimate computation circuitry 110 calculates an instantaneous noise estimate R(n,k), which may be a ratio between the instantaneous power value S(n,k) and the second weighted power value $S_G(k)$. The instantaneous noise ratio estimate R(n,k) may be compared to a threshold value to compute a speech absence probability for frequency index k. The speech absence probability may then be used to calculate the instantaneous signal-to-noise ratio (SNR) for the noisy speech signal.

Figure 2:
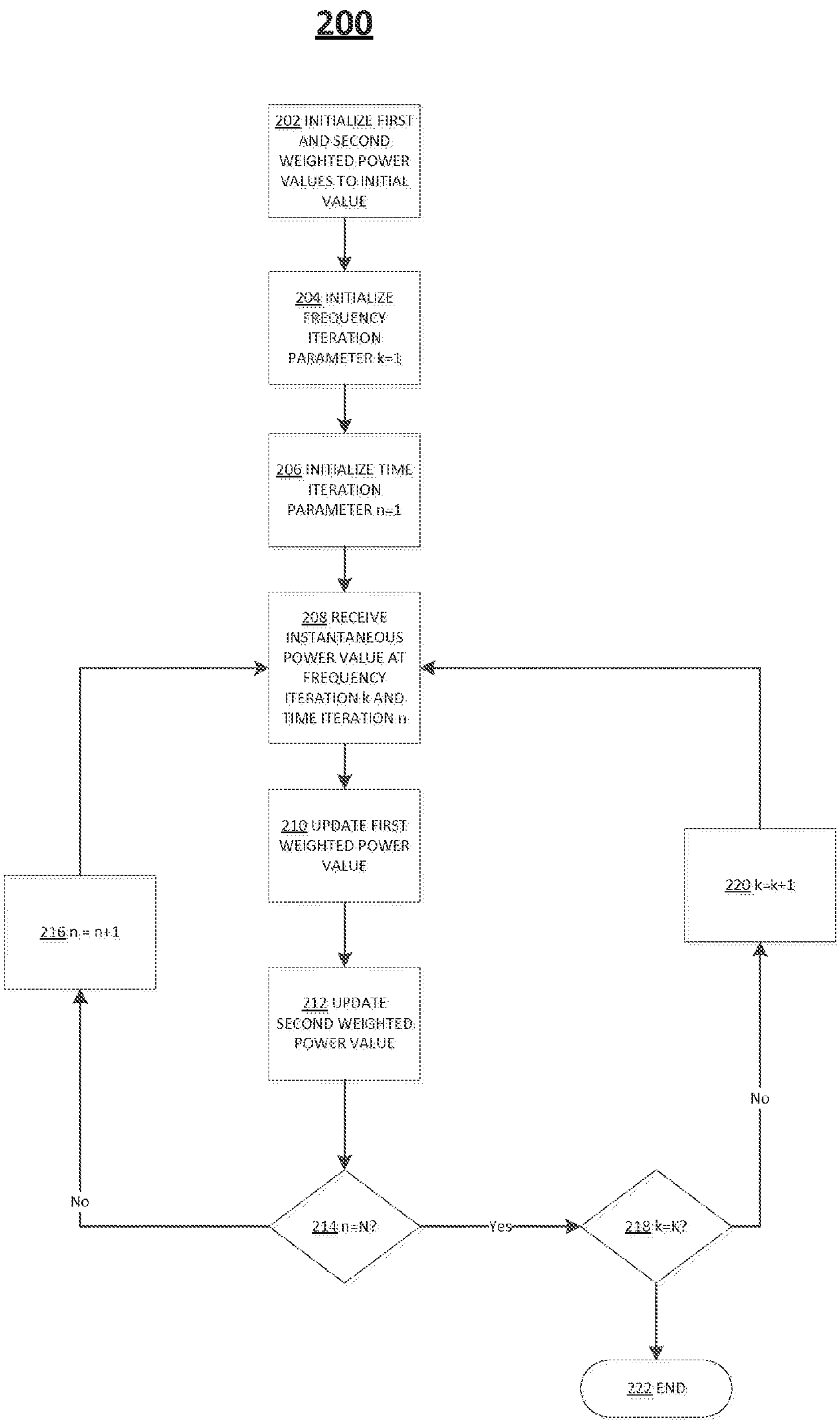
FIG. 2 illustrates a process for calculating an estimate for a noise power ratio, according to an embodiment of the present disclosure.

FIG. 2 is a flow diagram of process 200 for determining an instantaneous noise power estimate, in accordance with an embodiment of the present disclosure. Process 200 includes initializing first $S_L(k)$ and second $S_G(k)$ weighted power values to an initial value (202), initializing frequency iteration parameter k to one (204) and initializing time iteration parameter n to one (206). As used herein, "frequency k" and "time n" will be understood to refer to frequency iteration parameter k and time iteration parameter n. Instantaneous power values S(n,k) are received at frequency k and time n (208). First weighted power value $S_L(k)$ is updated (210), and second weighted power value $S_G(k)$ is updated (212). When time n is not equal to total time iterations N (214), n is incremented by one (216), and the instantaneous power value S(n,k) is received (208). After all time iterations are complete, frequency k is incremented by one (220), and another value for the instantaneous power value S(n,k) is received (208). Process 200 ends (222) when all time iterations and all frequency iterations are complete.

At 202, the first and second weighted power values $S_L(k)$ and $S_G(k)$ are initialized to an initial value and may be stored in memory 102. As was described in relation to FIG. 1, first weighted power value computation circuitry 106 is configured to update the value for the first weighted power value $S_L(k)$, and second weighted power value computation circuitry 108 is configured to update the value for the second weighted power value $S_G(k)$. In particular, the first weighted power value $S_L(k)$ may approximate a local minimum power value of the noisy speech signal, while the second weighted power value $S_G(k)$ may approximate a global minimum power value of the noisy speech signal. At 202, both of these values are initialized to an initial value before being subsequently updated.

At 204, frequency k is initialized to one and may be stored in memory 102. Frequency k may represent a single frequency or may represent a range of frequencies.

At 206, time n is initialized to one. Time n may be an index of a collection, such as a time frame, over which the frequency transform may be computed to obtain the power value S(n,k) for frame index n and frequency index k.

At 208, an instantaneous power value S(n,k) is received for frequency k and time n. As is described in relation to FIG. 1, noisy speech signal receiver 104 may receive the instantaneous power value S(n,k) and store it in memory 102. The instantaneous power value S(n,k) may be the smoothed power magnitude at frequency k and time n.

At 210, the first weighted power value $S_L(k)$ is updated. In an example, $S_L(k)$ is updated in accordance with EQ. 1.

$$S_L(k)=\alpha_L(k)*S_L(k)+(1-\alpha_L(k))*S(n,k) \qquad \text{EQ. 1}$$

In particular, the computation described by EQ. 1 indicates that the first weighted power value $S_L(k)$ is updated by calculating a weighted sum of the instantaneous power value S(n,k) and the current value of the first weighted power value $S_L(k)$. The parameter $\alpha_L(k)$ corresponds to a first weighting parameter at frequency k, and is described in detail in relation to FIG. 3.

At 212, the second weighted power value $S_G(k)$ is updated. In an example, the second weighted power value $S_G(k)$ is updated in accordance with EQ. 2.

$$S_G(k)=\alpha_G(k)*S_G(k)+(1-\alpha_G(k))*S_L(k) \qquad \text{EQ. 2}$$

In particular, the computation described by EQ. 2 indicates that the second weighted power value $S_G(k)$ may be updated by calculating a weighted sum of the second weighted power value $S_G(k)$ and the first weighted power value $S_L(k)$. The parameter $\alpha_G(k)$ is a second weighting parameter at frequency k, and is described in detail in relation to FIG. 4.

At 214, the time n is compared to a total number of time iterations N. If n has not yet reached N, n is incremented by 1 at 216, and process 200 returns to 208. After the $N^{th}$ time iteration is complete, process 200 proceeds to 218 to compare the frequency k to a total number of frequency iterations K. If k has not yet reached K, then frequency k is incremented by 1 at 220, and process 200 returns to 208. After all N time iterations and all K frequency iterations are complete, process 200 ends at 222.

Figure 3:
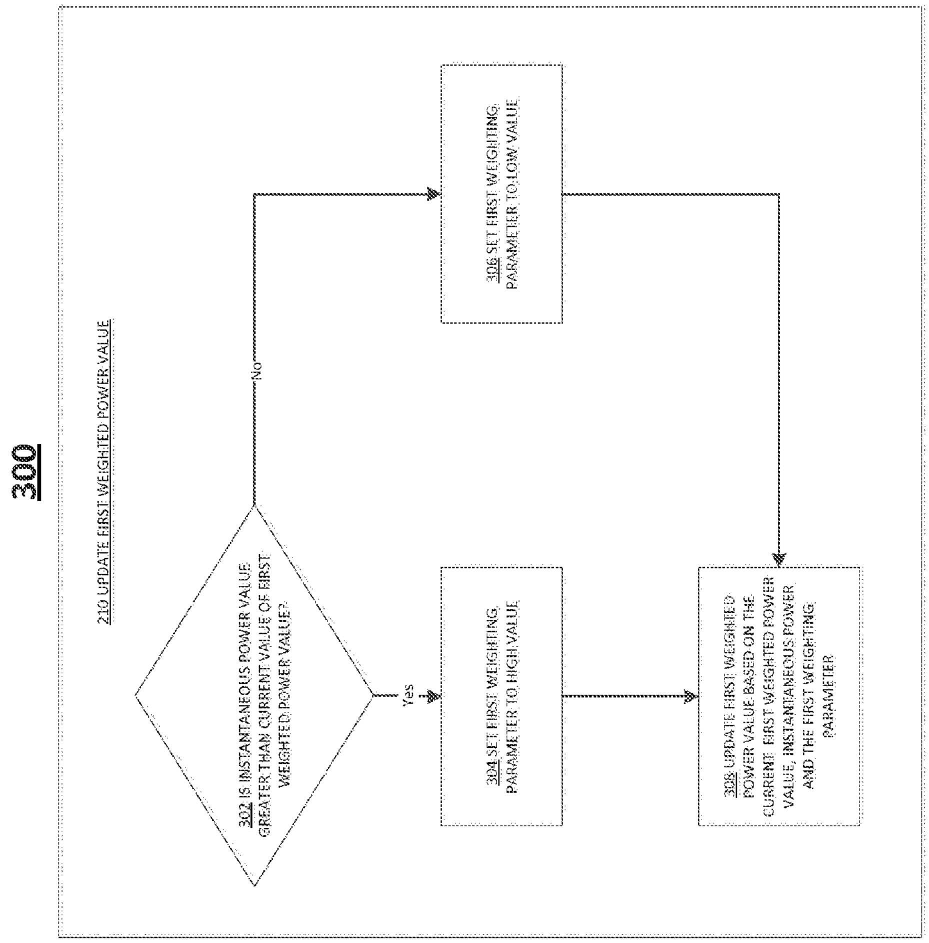
FIG. 3 illustrates a process for updating a first weighted power value, according to an embodiment of the present disclosure.

FIG. 3 is a flow diagram of a process 300 for updating first weighted power value $S_L(k)$, in accordance with an embodiment of the present disclosure. In some embodiments, process 300 is used at 210 of process 200.

At 302, it is determined whether the instantaneous power value S(n,k) is greater than the first weighted power value $S_L(k)$. As $S_L(k)$ is essentially an estimate of a local minimum, if S(n,k) is greater than $S_L(k)$, the estimate of the local minimum is still valid, and $S_L(k)$ should not change significantly. If S(n,k) is greater than $S_L(k)$, process 300 proceeds to 304 to set first weighting parameter $\alpha_L(k)$ to a high value. In one example, a high value for the first weighting parameter $\alpha_L(k)$ may be a value near one, such as 0.9 or any value in the range 0.6 to 0.999. However, the first weighting parameter $\alpha_L(k)$ may be normalized to any value, and a high value for $\alpha_L(k)$ may correspond to any suitable value for a weighting parameter. In accordance with EQ. 1, setting weighting parameter $\alpha_L(k)$ to a value near one assigns greater weight to first weighted power value $S_L(k)$ than to the instantaneous power value S(n,k). Therefore, the updated first weighted power value $S_L(k)$ will be closer to the previous value of $S_L(k)$ than to S(n,k).

Otherwise, if S(n,k) is not greater than $S_L(k)$, process 300 proceeds to 306 to set the first weighting parameter $\alpha_L(k)$ to a low value. As $S_L(k)$ is essentially an estimate of a local minimum, if S(n,k) is less than $S_L(k)$, the estimate of the local minimum is not valid (because a power value lower than the local minimum is detected), and $S_L(k)$ should be updated to reflect the new low power value. In one example, when the high value for $\alpha_L(k)$ is near one, a low value for $\alpha_L(k)$ may be a value near zero, such as 0.1 or any value between 0.0001 and 0.4. However, $\alpha_L(k)$ may be normalized to any number, and a low value for $\alpha_L(k)$ may correspond to any suitable value for a weighting parameter. In accordance with EQ. 1, setting the weighting parameter $\alpha_L(k)$ to a value near zero assigns greater weight to instantaneous power value S(n,k) than first weighted power value $S_L(k)$. In this case, the updated first weighted power value $S_L(k)$ will be closer to S(n,k) than the previous value of $S_L(k)$.

At 308, the first weighted power value $S_L(k)$ is updated based on the current value for $S_L(k)$, S(n,k) and $\alpha_L(k)$ in accordance with EQ. 1, for example. If $\alpha_L(k)$ has a high value, the updated $S_L(k)$ is heavily weighted in favor of the current value of $S_L(k)$. Otherwise, if $\alpha_L(k)$ has a low value, the updated $S_L(k)$ is heavily weighted in favor of the instantaneous power value S(n,k).

As is described herein, the updated $S_L(k)$ does not greatly change (i.e., the updated $S_L(k)$ remains close to the previous value of $S_L(k)$) when S(n,k) is greater than $S_L(k)$, meaning that the current local minimum approximation should not be updated to the instantaneous value because no value below the current approximation has been reached. Alternatively, when an instantaneous power value below the current local minimum approximation has been reached, then $S_L(k)$ is updated to a value that resembles the instantaneous value.

Process 300 is an illustrative example of how the first weighted power value $S_L(k)$ may be updated. Other methods may be used for updating values of the first weighted power value $S_L(k)$, without departing from the scope of the present disclosure. For example, EQ. 1 only shows two parameters that are weighted (i.e., $S_L(k)$ and S(n,k)), but EQ. 1 may be modified to include any number of parameters that are weighted. In an example, EQ. 1 may be modified to be the weighted sum of three variables such as the first weighted parameter $S_L(k)$, an intermediate weighted parameter $S_A(k)$ and the instantaneous power value S(n,k). Each of these values may be weighted by a weighting parameter where the three weighting parameters may sum to 1. As shown in EQ. 1 and described in relation to FIG. 3, $\alpha_L(k)$ is a weight that is applied to $S_L(k)$ and is set based on a comparison between S(n,k) and $S_L(k)$. Equivalently, the weighting parameter $(1-\alpha_L(k))$ may be set to a high value when S(n,k) is less than $S_L(k)$ and a low value when S(n,k) is greater than $S_L(k)$. Additional modifications may be made to the exemplary embodiment to achieve a similar result as what is described herein.

Figure 4:
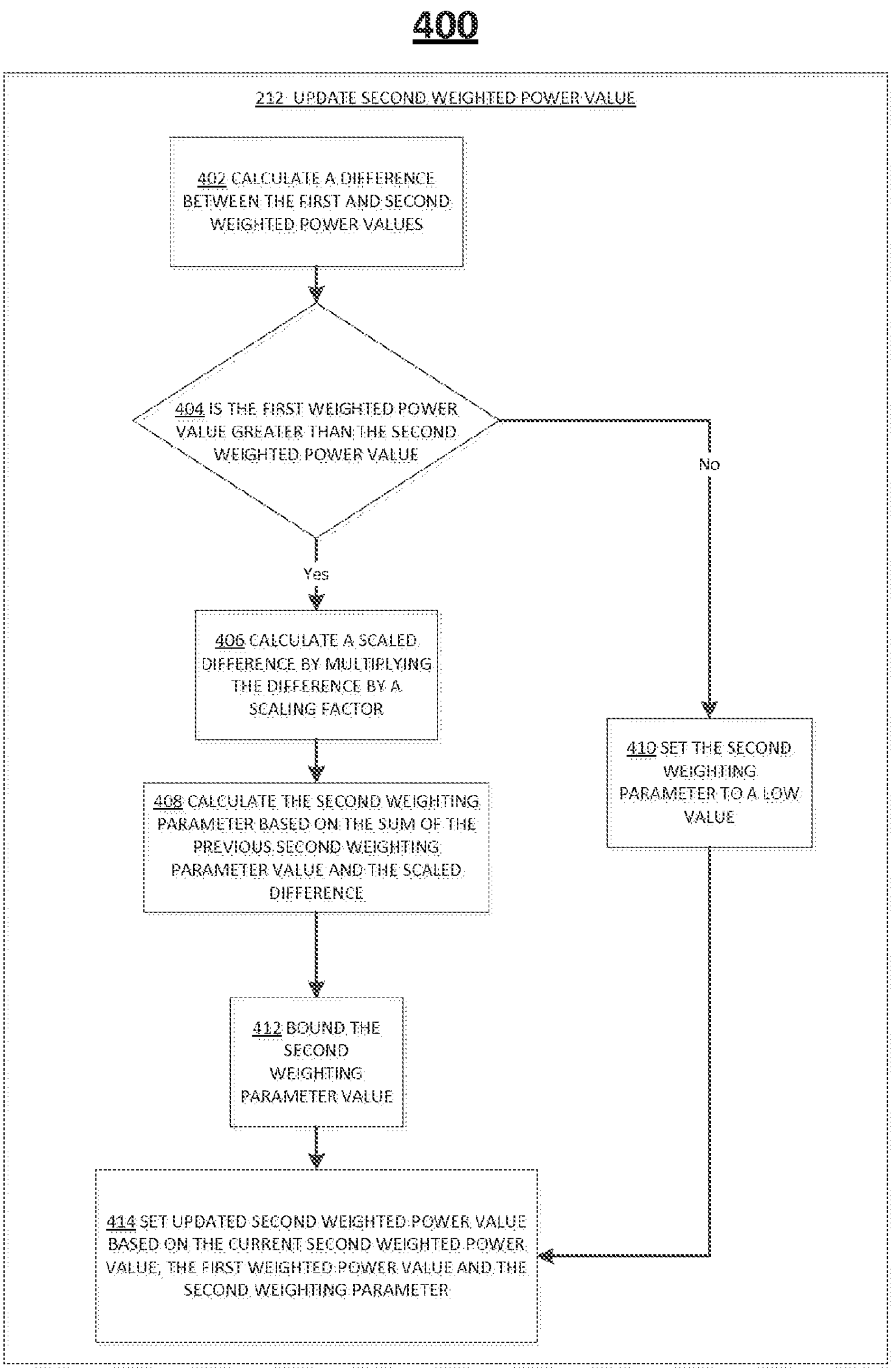
FIG. 4 illustrates a process for updating a second weighted power value, according to an embodiment of the present disclosure.

FIG. 4 is a flow diagram of a process 400 for updating a second weighted power value $S_G(k)$, in accordance with an embodiment of the present disclosure. In some embodiments, process 400 is used at 212 of process 200.

At 402, a difference value D(k) is computed between the first weighted power value $S_L(k)$ and the second weighted power value $S_G(k)$. For example, D(k) may be calculated in accordance with EQ. 3.

$$D(k)=S_L(k)S_G(k) \qquad \text{EQ. 3}$$

As is shown in EQ. 3, if D(k) is greater than zero, this means that $S_L(k)$ exceeds $S_G(k)$, and the opposite is true if D(k) is less than zero. At 404, difference D(k) is compared to zero to determine whether $S_L(k)$ exceeds $S_G(k)$.

If $S_L(k)$ exceeds $S_G(k)$, process 400 proceeds to 406 to update the value for the difference D(k). In particular, the difference D(k) is updated to be scaled by a scaling parameter M, an example of which is shown in accordance with EQ. 4.

$$D(k)=D(k)*M \qquad \text{EQ. 4}$$

The scaling parameter M may be a predetermined value, and may depend on the particular implementation or application. A large value of M causes the value of the scaled difference D(k) to be large as well. As is described below, the particular value for M may determine the amount by which second weighting parameter $\alpha_G$ changes when D(k) is positive.

At 408, the second weighting parameter $\alpha_G(k)$ is updated based on the sum of second weighting parameter $\alpha_G(k)$ and the scaled difference D(k). In one example, $\alpha_G(k)$ may be incremented by the value of the scaled difference D(k), in accordance with EQ. 5.

$$\alpha_G(k)=\alpha_G+D(k) \quad \text{EQ. 5}$$

Since D(k) is a positive number (as evaluated at 404), this means that the updated value for $\alpha_G(k)$ is larger than a previous value. In accordance with EQ. 2, for a large value of $\alpha_G(k)$, the updated value for $S_G(k)$ will resemble $S_G(k)$, meaning that the approximation for the global minimum in the power spectrum is mostly unchanged. This may occur when the previous value of $\alpha_G(k)$ is large or when the scaled difference D(k) is large. A large scaled difference D(k) may result when M is selected to be large at 406.

At 412, the second weighting parameter $\alpha_G(k)$ may be bounded within a predetermined range. EQ. 6 represents an exemplary bounding function.

$$\alpha_G(k)=\max(\min(\alpha_G(k),0.999),0) \quad \text{EQ. 6}$$

In EQ. 6, $\alpha_G(k)$ is bounded within 0 and 0.999. In general, $\alpha_G(k)$ may be bounded using other bounding functions and may be bound to different values. In the example shown in EQ. 2, the effect of $S_L(k)$ may range from being very large (i.e., $\alpha_G(k)$ close to 0) to almost negligible (i.e., $\alpha_G(k)$ close to 0.999) on the updated value of $S_G(k)$.

If $S_L(k)$ does not exceed $S_G(k)$, process 400 proceeds to 410 to set a value for $\alpha_G(k)$. In particular, at 410, $\alpha_G(k)$ is set to a low value, such as 0.001 or another value close to zero. In some embodiments, the low value set at 410 for $\alpha_G(k)$ is less than the low value set at 306 for $\alpha_L(k)$. As an example, in accordance with EQ. 2, setting $\alpha_G(k)$ to a low value means that $S_G(k)$ is updated to a value that resembles $S_L(k)$.

At 414, the value for the second weighted power value $S_G(k)$ is updated based on a previous value for the second weighted power value $S_G(k)$, the first weighted power value $S_L(k)$ and the second weighting parameter $\alpha_G(k)$. As described above, the value of $S_G(k)$ may be updated in accordance with exemplary EQ. 2.

Process 400 shows an exemplary embodiment of how $S_G(k)$ may be updated. One skilled in the art will realize that there are many other methods for updating $S_G(k)$ without departing from the scope of the present disclosure. For example, EQ. 2 only shows two parameters that are weighted (i.e., $S_G(k)$ and $S_L(k)$), but EQ. 2 may be modified to include any number of parameters that are weighted. In this example, EQ. 2 may be modified to be the weighted sum of three variables such as the first weighted power value $S_L(k)$, an intermediate second weighted parameter $S_B(k)$ and the second weighted power value $S_G(k)$. Each of these values may be weighted by a weighting parameter where the weighting parameters sum to 1. As shown in EQ. 2 and described in relation to FIG. 4, $\alpha_G(k)$ is a weight that is applied to $S_G(k)$. Equivalently, the weighting parameter $(1-\alpha_G(k))$ may be set to a high value when $S_L(k)$ is less than $S_G(k)$. Additional modifications may be made to the exemplary embodiment to achieve a similar result as what is described herein.

Figure 5:
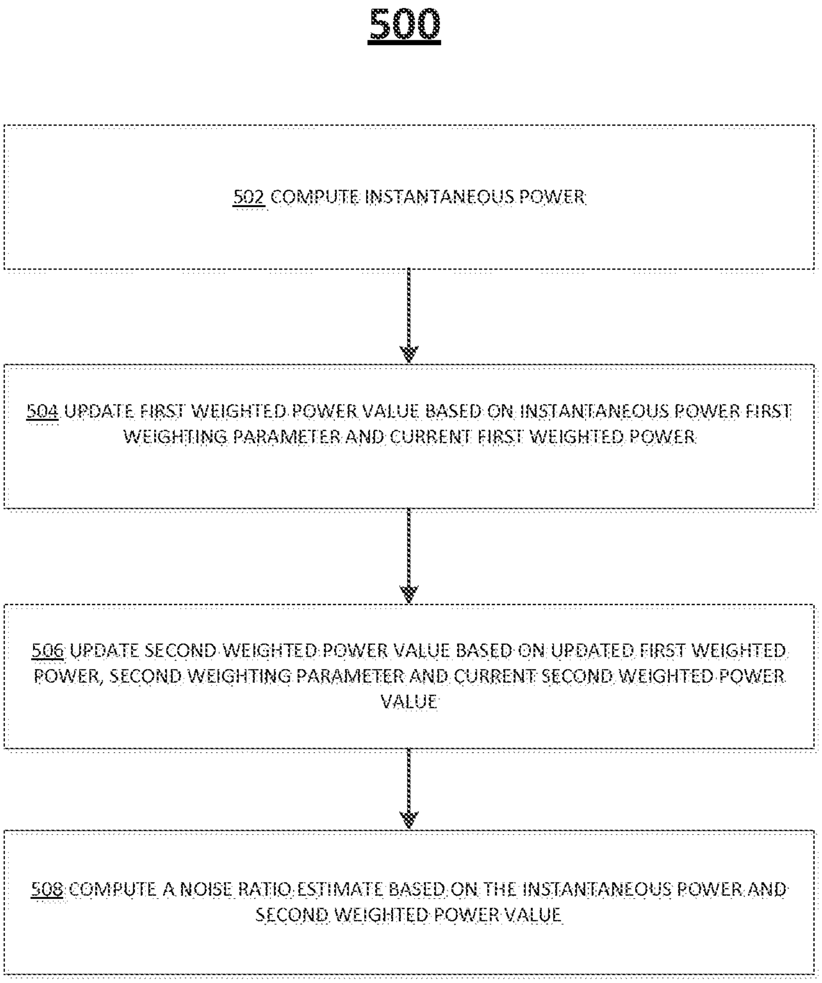
FIG. 5 illustrates a process for calculating a first and a second weighted power value, according to an embodiment of the present disclosure.

FIG. 5 is a flow diagram of a process 500 for computing a noise ratio estimate in accordance with an embodiment of the disclosure.

At 502, an instantaneous power value S(n,k) corresponding to a frequency of a noisy speech signal is received by a receiver device (e.g., noisy speech signal receiver 104). This value may be stored in memory (e.g., memory 102) so it can be accessed by computation circuitry (e.g., first weighted power value computation circuitry 106, second weighted power value computation circuitry 108 and noise ratio estimate computation circuitry 110).

At 504, a first weighted power value $S_L(k)$ is updated based on the instantaneous power value S(n,k) and a first weighting parameter $\alpha_L(k)$ to obtain an updated first weighted power value $S_L(k)$. The first weighted power value $S_L(k)$ may apply a higher weighting to recent samples in the portion of the speech signal compared to the second weighted power value $S_G(k)$. The first weighting parameter $\alpha_L(k)$ may be computed based on a comparison between the instantaneous power value S(n,k) and the first weighted power value $S_L(k)$. Updating the first weighted power value $S_L(k)$ may comprise calculating a weighted sum of first weighted power value $S_L(k)$ and the instantaneous power value S(n,k) (e.g. in accordance with EQ. 1). When the instantaneous power value S(n,k) exceeds the first weighted power value $S_L(k)$, the updated first weighted power value $S_L(k)$ may be substantially unchanged from $S_L(k)$. When the first weighted power value $S_L(k)$ exceeds the instantaneous power value S(n,k), updated $S_L(k)$ may be substantially similar to S(n,k).

At 506, the second weighted power value $S_G(k)$ may be updated based on the first weighted power value $S_L(k)$ and the second weighting parameter $\alpha_G(k)$ to obtain an updated second weighted power value $S_G(k)$. Updating the second weighted power value $S_G(k)$ may comprise calculating a weighted sum of $S_L(k)$ and $S_G(k)$ (e.g. in accordance with EQ. 2). Difference D(k) may be computed between the first weighted power value $S_L(k)$ and the second weighted power value $S_G(k)$. When the first weighted power value $S_L(k)$ exceeds the second weighted power value $S_G(k)$, difference D(k) may be scaled by a scaling factor M. Scaled difference D(k) may be added to $\alpha_G(k)$ before updating $S_G(k)$. When the second weighed power value $S_G(k)$ exceeds the first weighted power value $S_L(k)$, $\alpha_G(k)$ may be set such that the updated second weighted power value $S_G(k)$ is substantially equal to $S_L(k)$.

At 508, a noise ratio estimate R(n,k) may be computed based on the instantaneous power S(n,k) and the second weighted power value $S_G(k)$. The value of R(n,k) may provide an estimate of the instantaneous signal to noise ratio.

Figure 6:
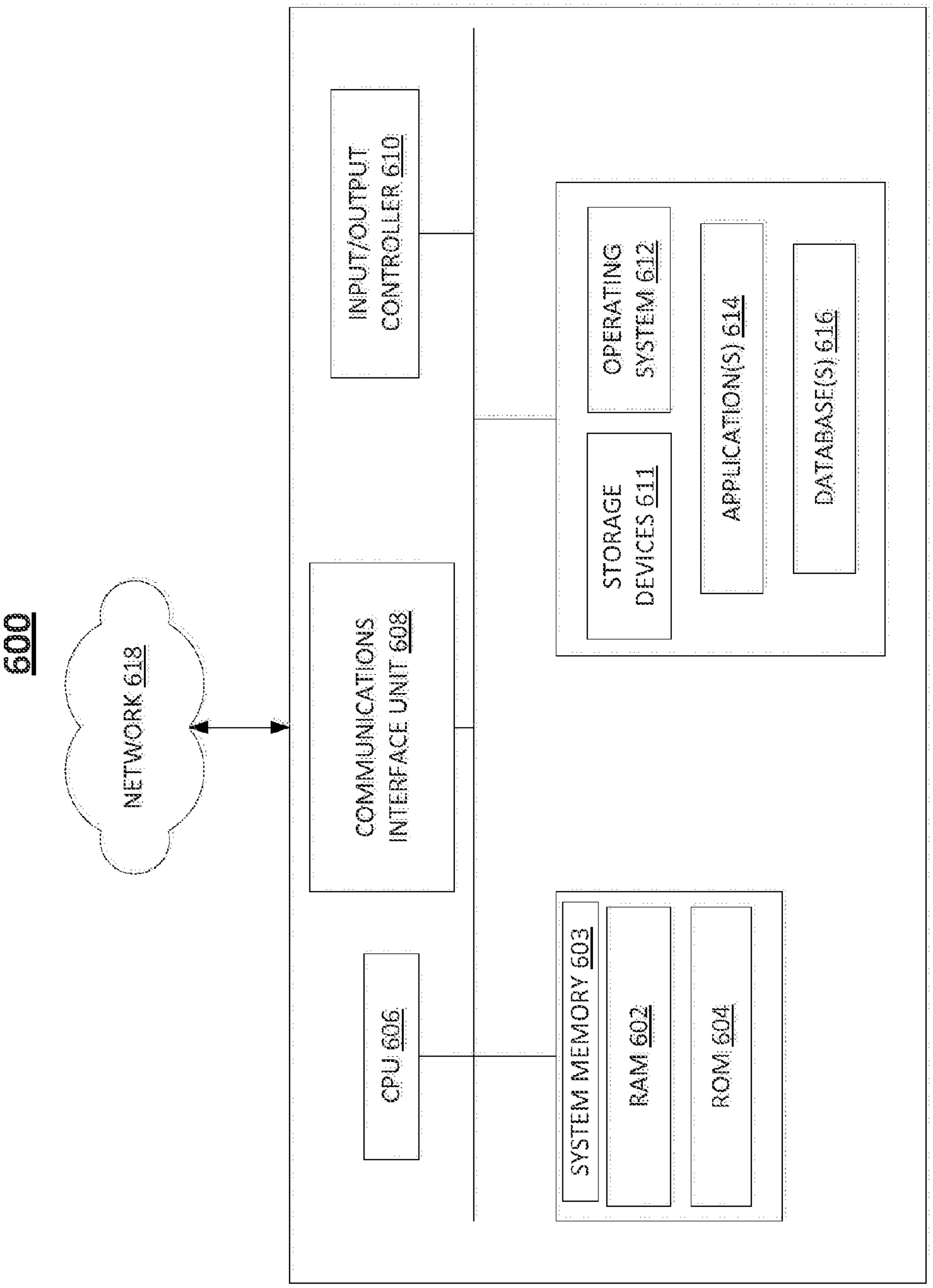
FIG. 6 is a block diagram of a computing device for performing any of the processes described herein, according to an embodiment of the present disclosure.

FIG. 6 is a block diagram of a computing device 600, such as any of the components of the systems of FIG. 1, for performing any of the processes described herein, in accordance with an embodiment of the disclosure. Each of the components of these systems may be implemented on one or more computing devices 600. In certain aspects, a plurality of the components of these systems may be included within one computing device 600. In certain embodiments, a component and a storage device 611 may be implemented across several computing devices 600.

The computing device 600 comprises at least one communications interface unit 608, an input/output controller 610, system memory 603, and one or more data storage devices 611. System memory 603 includes at least one random access memory (RAM 602) and at least one read-only memory (ROM 604). All of these elements are in communication with a central processing unit (CPU 606) to facilitate the operation of computing device 600. The computing device 600 may be configured in many different ways. For example, the computing device 600 may be a conventional standalone computer or alternatively, the functions of computing device 600 may be distributed across multiple computer systems and architectures. In FIG. 6, the computing device 600 is linked, via network 618 or local network, to other servers or systems.

The computing device 600 may be configured in a distributed architecture, wherein databases and processors are housed in separate units or locations. Some units perform primary processing functions and contain at a minimum a general controller or a processor and a system memory 603. In distributed architecture embodiments, each of these units may be attached via the communications interface unit 608 to a communications hub or port (not shown) that serves as a primary communication link with other servers, client or user computers and other related devices. The communications hub or port may have minimal processing capability itself, serving primarily as a communications router. A variety of communications protocols may be part of the system, including, but not limited to: Ethernet, SAP, SAS™, ATP, BLUETOOTH™, GSM and TCP/IP.

The CPU 606 comprises a processor, such as one or more conventional microprocessors and one or more supplementary co-processors such as math co-processors for offloading workload from the CPU 606. The CPU 606 is in communication with the communications interface unit 608 and the input/output controller 610, through which the CPU 606 communicates with other devices such as other servers, user terminals, or devices. The communications interface unit 608 and the input/output controller 610 may include multiple communication channels for simultaneous communication with, for example, other processors, servers or client terminals.

The CPU 606 is also in communication with the data storage device 611. The data storage device 611 may comprise an appropriate combination of magnetic, optical or semiconductor memory, and may include, for example, RAM 602, ROM 604, flash drive, an optical disc such as a compact disc or a hard disk or drive. The CPU 606 and the data storage device 611 each may be, for example, located entirely within a single computer or other computing device; or connected to each other by a communication medium, such as a USB port, serial port cable, a coaxial cable, an Ethernet cable, a telephone line, a radio frequency transceiver or other similar wireless or wired medium or combination of the foregoing. For example, the CPU 606 may be connected to the data storage device 611 via the communications interface unit 608. The CPU 606 may be configured to perform one or more particular processing functions.

The data storage device 611 may store, for example, (i) an operating system 612 for the computing device 600; (ii) one or more applications 614 (e.g., computer program code or a computer program product) adapted to direct the CPU 606 in accordance with the systems and methods described here, and particularly in accordance with the processes described in detail with regard to the CPU 606; or (iii) database(s) 616 adapted to store information that may be utilized to store information required by the program.

The operating system 612 and applications 614 may be stored, for example, in a compressed, an uncompiled and an encrypted format, and may include computer program code. The instructions of the program may be read into a main memory of the processor from a computer-readable medium other than the data storage device 611, such as from the ROM 604 or from the RAM 602. While execution of sequences of instructions in the program causes the CPU 606 to perform the process steps described herein, hard-wired circuitry may be used in place of, or in combination with, software instructions for embodiment of the processes of the present disclosure. Thus, the systems and methods described are not limited to any specific combination of hardware and software.

Suitable computer program code may be provided for performing one or more functions in relation to determining a noise ratio estimate for a noisy speech signal as described herein. The program also may include program elements such as an operating system 612, a database management system and "device drivers" that allow the processor to interface with computer peripheral devices (e.g., a video display, a keyboard, a computer mouse, etc.) via the input/output controller 610.

The term "computer-readable medium" as used herein refers to any non-transitory medium that provides or participates in providing instructions to the processor of the computing device 600 (or any other processor of a device described herein) for execution. Such a medium may take many forms, including, but not limited to, non-volatile media and volatile media. Non-volatile media include, for example, optical, magnetic, or opto-magnetic disks, or integrated circuit memory, such as flash memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, or any other non-transitory medium from which a computer can read.

Various forms of computer readable media may be involved in carrying one or more sequences of one or more instructions to the CPU 606 (or any other processor of a device described herein) for execution. For example, the instructions may initially be borne on a magnetic disk of a remote computer (not shown). The remote computer can load the instructions into its dynamic memory and send the instructions over an Ethernet connection, cable line, or even telephone line using a modem. A communications device local to a computing device 600 (e.g., a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information.

While various embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. It is intended that the following claims define the scope of the disclosure and that methods and structures within the scope of these claims and their equivalents be covered thereby.

What is claimed is:

1. A method for providing an estimate for noise in a speech signal, the method comprising:

receiving an instantaneous power value corresponding to a frequency index of a portion of the speech signal;

comparing the instantaneous power value and a first weighted power value to determine whether the instantaneous power value exceeds the first weighted power value;

updating the first weighted power value based on a first weighting parameter and the comparing the instantaneous power value and the first weighted power value, to obtain an updated first weighted power value that is substantially unchanged from the current first weighted power value or substantially similar to the instantaneous power value;

updating a second weighted power value based on the first weighted power value and a second weighting parameter to obtain an updated second weighted power value; and computing the estimate for the noise from the instantaneous power value and the second weighted power value.

2. The method of claim 1, wherein the first weighted power value applies higher weighting to recent samples in the portion of the speech signal compared to the second weighted power value.

3. The method of claim 1, wherein updating the first weighted power value comprises calculating a weighted sum of the first weighted power value and the instantaneous power value.

4. The method of claim 1, further comprising computing the first weighting parameter based on the comparison between the instantaneous power value and the first weighted power value.

5. The method of claim 1, further comprising:

updating the first weighted power value to the value substantially unchanged from the current first weighted power value when the instantaneous power value exceeds the first weighted power value; and updating the first weighted power value to the value substantially similar to the instantaneous power value when the first weighted power value exceeds the instantaneous power value.

6. The method of claim 1, wherein updating the second weighted power value comprises calculating a weighted sum of the first weighted power value and the second weighted power value.

7. The method of claim 1, further comprising computing the second weighting parameter based on a comparison between the first weighted power value and the second weighted power value.

8. The method of claim 7, further comprising:

computing a difference between the first weighted power value and the second weighted power value;

when the first weighted power value exceeds the second weighted power value:

scaling the difference by a scaling factor; and incrementing the second weight parameter by the difference before updating the second weighted power value.

9. The method of claim 7, wherein when the second weighted power value exceeds the first weighted power value, the second weighting parameter is set such that the updated second weighted power value is substantially equal to the first weighted power value.

10. The method of claim 1, wherein a maximum value for the second weighting parameter is greater than a maximum value for the first weighting parameter, and a minimum value for the second weighting parameter is less than a minimum value for the first weighting parameter.

11. A system for providing an estimate for noise in a speech signal, the system comprising a processor configured to:

receive an instantaneous power value corresponding to a frequency index of a portion of the speech signal;

compare the instantaneous power value and a first weighted power value to determine whether the instantaneous power value exceeds the first weighted power value;

update the first weighted power value based on a first weighting parameter and the comparing the instantaneous power value and the first weighted power value to, obtain an updated first weighted power value that is substantially unchanged from the current first weighted power value or substantially similar to the instantaneous power value;

update a second weighted power value based on the first weighted power value and a second weighting parameter to obtain an updated second weighted power value; and compute the estimate for the noise from the instantaneous power value and the second weighted power value.

12. The system of claim 11, wherein the first weighted power value applies higher weighting to recent samples in the portion of the speech signal compared to the second weighted power value.

13. The system of claim 11, wherein the processor is further configured to update the first weighted power value by calculating a weighted sum of the first weighted power value and the instantaneous power value.

14. The system of claim 11, wherein the processor is further configured to compute the first weighting parameter based on the comparison between the instantaneous power value and the first weighted power value.

15. The system of claim 14, wherein the processor is further configured to:

update the first weighted power value to the value substantially unchanged from the current first weighted power value when the instantaneous power value exceeds the first weighted power value; and update the first weighted power value to the value substantially similar to the instantaneous power value when the first weighted power value exceeds the instantaneous power value.

16. The system of claim 11, wherein updating the second weighted power value comprises calculating a weighted sum of the first weighted power value and the second weighted power value.

17. The system of claim 11, wherein the processor is further configured to compute the second weighting parameter based on a comparison between the first weighted power value and the second weighted power value.

18. The system of claim 17, wherein the processor is further configured to:

compute a difference between the first weighted power value and the second weighted power value;

when the first weighted power value exceeds the second weighted power value:

scale the difference by a scaling factor; and increment the second weight parameter by the difference before updating the second weighted power value.

19. The system of claim 17, wherein when the second weighted power value exceeds the first weighted power value, the second weighting parameter is set such that the updated second weighted power value is substantially equal to the first weighted power value.

20. The system of claim 11, wherein a maximum value of the second weighting parameter is greater than a maximum value of the first weighting parameter, and a minimum value of the second weighting parameter is less than a minimum value of the first weighting parameter.

* * * * *